(12) United States Patent
Wang et al.

(10) Patent No.: US 7,580,633 B2
(45) Date of Patent: *Aug. 25, 2009

(54) METHOD AND DEVICE FOR DATA-FLOW PROTECTION OF OPTICAL INTERFACE IN DATA COMMUNICATION EQUIPMENT

(75) Inventors: Chongyang Wang, Shenzhen (CN); Zhichun Zhang, Shenzhen (CN); Shuyou Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/239,280

(22) Filed: Sep. 26, 2008

(65) Prior Publication Data

US 2009/0022490 A1 Jan. 22, 2009

Related U.S. Application Data

(63) Continuation of application No. 10/615,032, filed on Jul. 8, 2003, now Pat. No. 7,447,428.

(30) Foreign Application Priority Data

Jul. 18, 2002 (CN) ................ 02 1 26615

(51) Int. Cl.
*H04B 10/00* (2006.01)
*H04B 10/08* (2006.01)

(52) U.S. Cl. ............... 398/33; 398/34; 398/5; 398/7

(58) Field of Classification Search ......... 398/2, 398/4, 5, 7, 33, 34
See application file for complete search history.

(56) References Cited

U.S. PATENT DOCUMENTS

| 5,539,564 A * | 7/1996 | Kumozaki et al. ......... 398/2 |
| 6,744,760 B1 * | 6/2004 | Solheim ................. 370/366 |
| 6,947,623 B2 * | 9/2005 | Ramaswami et al. ....... 385/16 |
| 7,079,555 B2 * | 7/2006 | Baydar et al. ........... 370/532 |

* cited by examiner

*Primary Examiner*—Dalzid Singh

(57) ABSTRACT

A method for data-flow protection of an optical interface in data communication equipment includes: receiving an optical-signal from a source-neighboring device, then duplicating the received optical signal into two duplicated optical signals. One of the optical signals is sent to a protected device for processing. According to the protected device working status, either the optical signal having been processed by the protected device or the second duplicated optical signal is selected and sent to a destination-neighboring device. The device includes a first optical-signal duplicating unit and an optical-signal selecting unit. The first optical-signal duplicating unit is used for duplicating an optical signal, and the optical-signal selecting unit is used as a selector. The method and device proposed by the disclosure are independent to network topology and can protect data-flow reliably.

11 Claims, 5 Drawing Sheets

METHOD AND DEVICE FOR DATA-FLOW PROTECTION OF OPTICAL INTERFACE IN DATA COMMUNICATION EQUIPMENT

CROSS-REFERENCE TO RELATED APPLICATIONS

This application is a continuation of U.S. patent application Ser. No. 10/615,032 filed on Jul. 8, 2003. This application claims the benefit and priority of Chinese Patent Application No. 02126615.8, filed Jul. 18, 2002. The entire disclosures of each of the above applications are incorporated herein by reference.

FIELD

The present disclosure relates to data communication technology and to a method and device for data-flow protection of an optical interface in data communication equipment.

BACKGROUND

This section provides background information related to the present disclosure which is not necessarily prior art.

In network environment, data-flow is broken usually because of the failure of data communication equipment, such as router, switch and etc. The broken data-flow can be recovered usually by the multi-path effect of a network. Based on network protocols, the data sender can discover that there is a failure in intermediate communication equipment, and a new route is reselected to bypassing the failure equipment, as shown in FIG. 1.

Generally, the broken data-flow can be recovered by the multi-path effect of network; but in some specific situations, there are some drawbacks:

1. When communication equipment is at the edge of a network and there are no redundant routes, failure of intermediate communication equipment usually makes the communication equipment become an isolated information island.

2. In some special application, the source route has been defined and reselecting other route is not allowed for information security or other reasons.

3. Because failure detection of the equipment and route reselection are based on kinds of protocols, along with the best-effort nature of Internet, the duration from a failure of equipment to the data-flow recovery is unpredictable. For some applications, such as video and voice data transmission etc., are sensitive to the transmission time, and the transmission quality will be worse with this kind of data-flow recovery.

SUMMARY

This section provides a general summary of the disclosure, and is not a comprehensive disclosure of its full scope or all of its features.

The objective of the disclosure is to propose a method and device for data-flow protection of an optical interface, in which the data-flow break duration is short (millisecond level) and predictable.

A method for data-flow protection of an optical interface, may include:

receiving an optical signal from a source-neighboring device;

duplicating the optical signal into at least two duplicated optical signals: a first duplicated optical signal and a second duplicated optical signal, sending the first duplicated optical signal to the protected device for processing, and sending directly the second duplicated optical signal to be selected;

receiving a working status signal output generated by the protected device and an output optical-signal from the protected device, and selecting one from the second duplicated optical-signal and the output optical-signal of the protected device according to the working status signal output of the protected device, and sending the selected one to a destination-neighboring device.

The receiving a working status signal output may include, if the working status signal output of the protected device is normal, selecting the output optical-signal of the protected device and sending the output optical-signal to the destination-neighboring device; if the working status signal output of the protected device is abnormal, selecting the second duplicated optical-signal directly and sending the second duplicated optical-signal to the destination-neighboring device.

A data-flow protection device of an optical interface may include:

a first optical-signal duplicating unit and an optical-signal selecting unit;

wherein an input of the first optical-signal duplicating unit is connected to a source-neighboring device for receiving an optical-signal, one output of the first optical-signal duplicating unit is directly connected to one input of the optical-signal selecting unit, another output of the first optical-signal duplicating unit connects to input of a protected device;

wherein another input of the optical-signal selecting unit is connected to an optical-signal output of the protected device, a control end of the optical-signal selecting unit is connected with a working status signal output of the protected device, the output of the optical-signal selecting unit connects to a destination-neighboring device.

The optical-signal duplication unit is an optical splitter, and the optical-signal selecting unit is an optical switch.

A method for data-flow protection of an optical interface may include:

receiving an optical signal from a source-neighboring device;

duplicating the optical signal into at least two duplicated optical signals: a first duplicated optical signal and a second duplicated optical signal;

sending the first duplicated optical signal to the protected device for processing;

sending directly the second duplicated optical signal to be selected;

receiving a working status signal output of the protected device and an output optical-signal of the protected device from the protected device;

re-duplicating the output optical-signal of the protected device into at least two re-duplicated optical signals;

if the working status signal output of the protected device is normal and if an optical power of one of the two re-duplicated optical signals is not lower than a preset threshold value, selecting another re-duplicated optical signal to the destination-neighboring device;

if the working status signal output of the protected device is normal and the optical power of one of the two re-duplicated optical signals is lower than a preset threshold value, selecting the second duplicated optical signal directly and sending the second duplicated optical signal to the destination-neighboring device;

if the working status signal output of the protected device is abnormal, selecting the second duplicated optical signal directly and sending the second duplicated optical signal to the destination-neighboring device.

A data-flow protection device of an optical interface may include:

a first optical-signal duplicating unit, an optical-signal selecting unit, a second optical-signal duplicating unit, an optical power detecting module and a logic module;

wherein input of the first optical-signal duplicating unit is connected to a source-neighboring device for receiving an optical-signal, one output of the first optical-signal duplicating unit is directly connected to one input of the optical-signal selecting unit, another output of the first optical-signal duplicating unit connects to input of a protected device;

wherein optical-signal output of the protected device is connected to input of the second optical-signal duplicating unit, one output of the second optical-signal duplicating unit connects to the optical-signal selecting unit, another output of the second optical-signal duplicating unit connects to the input of the optical power detecting module;

wherein output of the optical power detecting module is connected to one input of the logic module, another input of the logic module is connected to working status signal output of the protected device, and the output of the logic module connects to a control end of the optical-signal selecting unit, the output of the optical-signal selecting unit connects to a destination-neighboring device.

The optical power detecting unit comprises an optical-electrical conversion diode, an operational amplifier and an analog comparator;

wherein the optical-electrical conversion component receives optical-signal outputted by the second optical-signal duplicating unit, converts the optical-signal to an electrical signal and output the electrical signal to the operational amplifier;

the analog comparator receives the amplified electrical signal from the operational amplifier, compares with a preset threshold value, outputs a control signal to one input of the logic module control.

The method and device for data-flow protection of an optical interface in data communication equipment are independent from network topology and can reliably implement data-flow protection. At the same time, the break time is short, so it is suitable for those data communication that are sensible to the break time. The method and device can satisfy the situation where routing is strictly limited in order to guarantee data security.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The present disclosure now will be described more fully hereinafter with reference to the accompanying drawings. This disclosure may, however, be embodied in many different forms and should not be construed as limited to the embodiments set forth herein; rather, these embodiments are provided so that this disclosure will be thorough and complete, and will fully convey the scope to those skilled in the art. Like numbers refer to like elements throughout.

Figure 1:
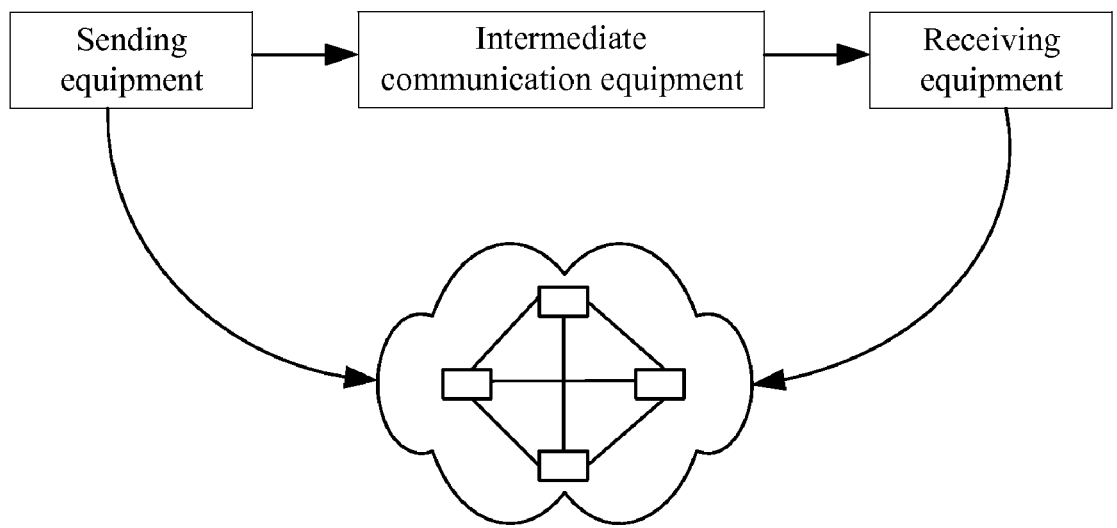
FIG. 1 shows a present data-flow protection diagram based on the network multi-path effect.
Figure 2:
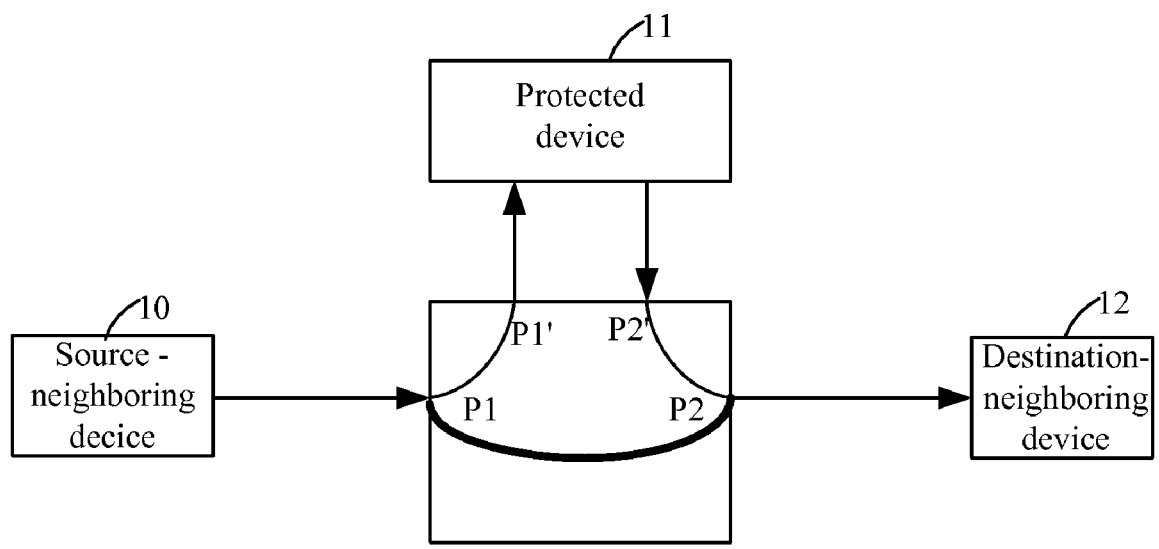
FIG. 2 shows the method logical diagram.

The logical diagram is shown in FIG. 2. The protected device 11, such as a router, the source-neighboring device 10 and the destination-neighboring device 12 are interconnected through the device, wherein P1, P1', P2 and P2' are optical interfaces. When the protected device 11 is normal, P1 and P2 are copied to P1' and P2', respectively. When there are failure or power breakdown in the protected device, P1 and P2 can be connected through the device and data is transferred transparently.

Figure 3:
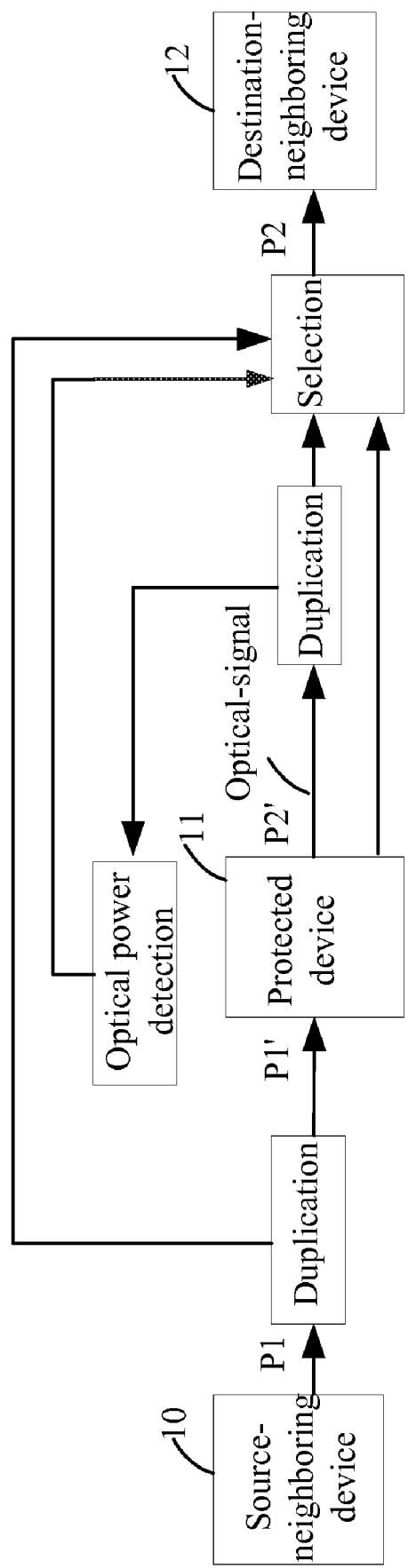
FIG. 3 shows the method detail diagram.

The detail logical diagram is shown in FIG. 3. The device receives optical-signal from the source-neighboring device 10, and duplicates received optical-signal into two optical-signals. One is sent to selector, another is processed by the protected device 11 and then re-duplicated into two optical-signals. One of the re-duplicated optical-signal is sent to the selector, which selects one of its input signals to send to the destination-neighboring device 12 according to working status of the protected device.

In the method mentioned above, when the protected device 11 is normal, the selector selects the re-duplicated optical-signal (the second time duplication) and sends to the destination-neighboring device. When the protected device 11 is abnormal, the selector selects the duplicated optical-signal (the first time duplication) and sends to the destination-neighboring device.

Another re-duplicated optical-signal (the second time duplication) is used for optical power detection. When the optical-signal power is lower than a preset threshold value, the selector selects the optical-signal of first time duplication, and then sends it to the destination device.

Figure 4:
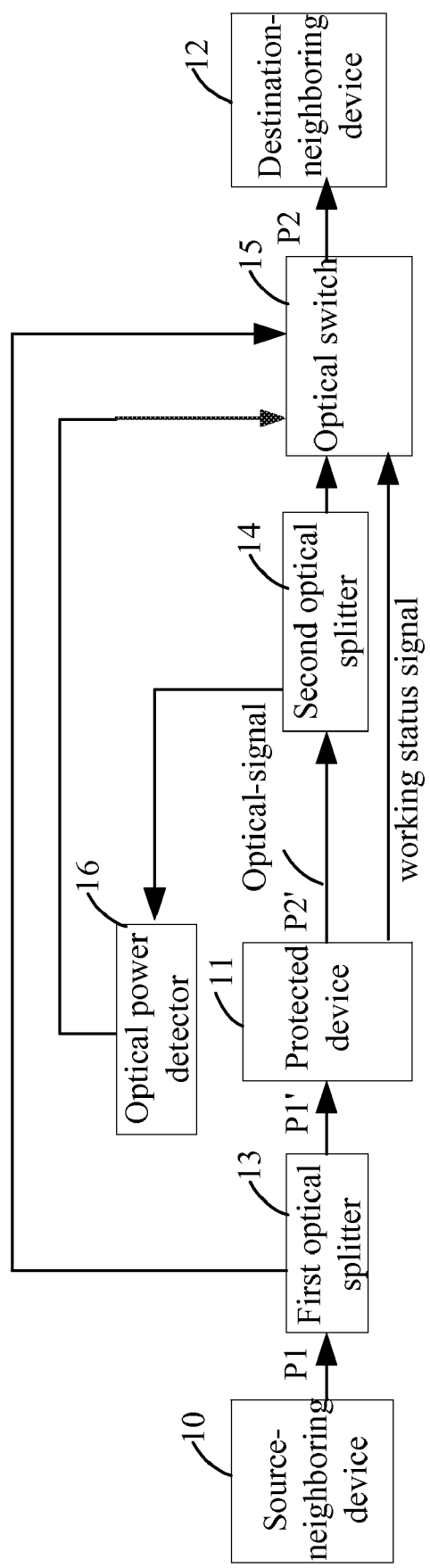
FIG. 4 shows the device diagram.

The device for protecting data-flow in the data communication equipment by using optical interface is shown in FIG. 4, there are two optical splitters and one optical switch. The first optical splitter 13 is set between the source-neighboring device 10 and the protected device 11. The second optical splitter 14 and optical switch 15 are sequentially set between the protected device 11 and the destination-neighboring device 12. The first optical splitter 13 is connected with the optical switch 15.

The working procedure of the device above is as follow. The first optical splitter receives the optical-signal carried data-flow sent by the source-neighboring device, and the received optical-signal is duplicated. One of the duplicated optical-signals is sent to the optical switch 15 directly. Another of the duplicated optical-signals is processed by the protected device 11, and then re-duplicated by the second optical splitter 14. One of the re-duplicated optical-signals is sent to the optical switch 15. According to the protected device working status, the optical switch 15 selects one of the two input optical-signals then sends to the destination-neighboring device. When the protected device is normal, the optical-signals from optical interface P2' of the protected device is selected; and when the protected device is failure, the optical-signals from optical interface P1 is selected, which does not pass the protected device.

The device above further includes an optical power detection module 16 that connects with the second optical splitter 14. The optical power detection module 16 receives a re-duplicated optical-signal, which is used for optical power detection, from the second optical splitter 14. The voltage output of the optical power detection module 16 is used to control selection of the optical switch 15.

Of course, the optical switch 15 also can be controlled by a logic module 17. If an optical power detected by the optical power detection module 16 is lower than a preset threshold value, the logic module 17 controls the optical switch 15 selecting the duplicated optical-signal from the optical splitter 13 to send to the destination-neighboring device 12, otherwise, if working status of the protected device is not normal, the logic module 17 controls the optical switch 15 selecting the duplicated optical-signal from the optical splitter 13, if working status of the protected device is normal, the logic module 17 controls the optical switch 15 selecting the re-duplicated optical-signal from the optical splitter 14 to send to the destination-neighboring device 12.

Figure 5:
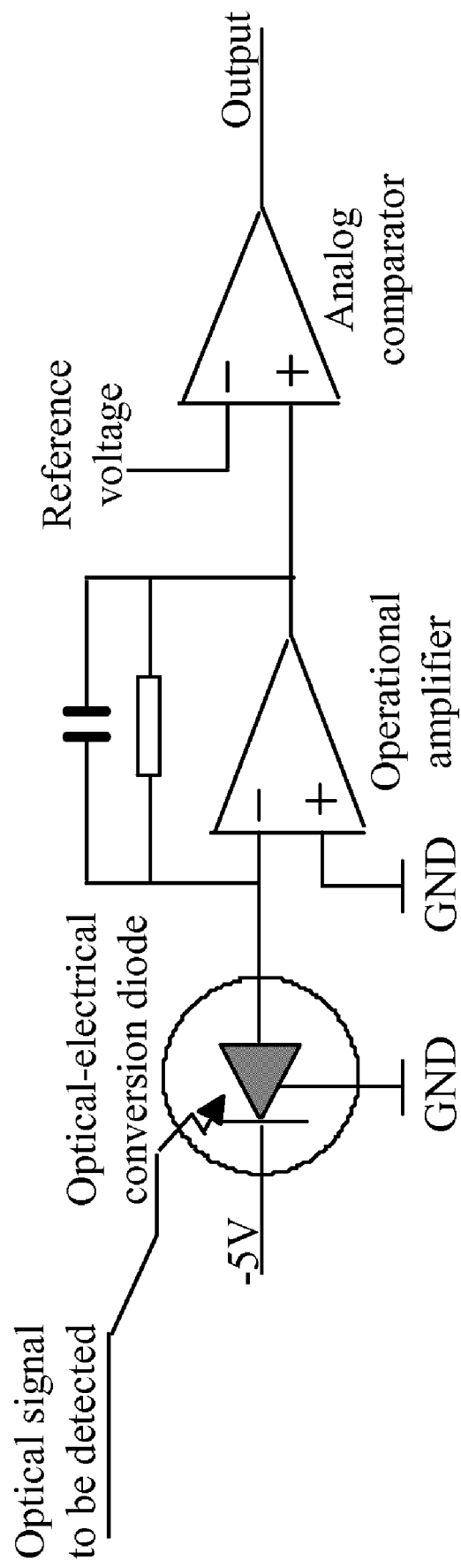
FIG. 5 shows the circuit diagram of the optical power detection module.
Figure 6:
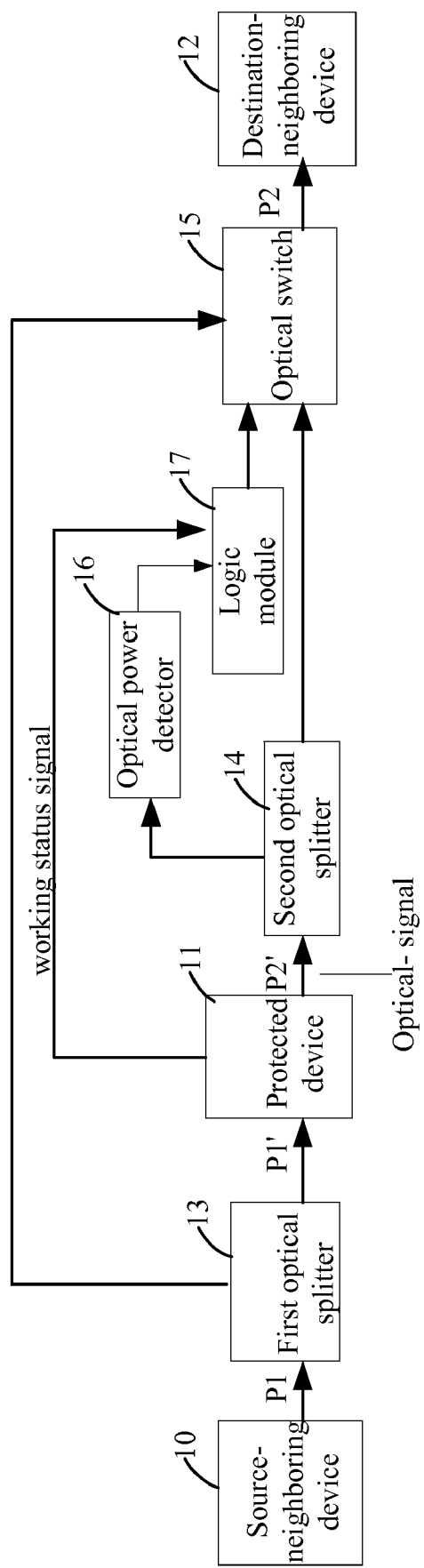
FIG. 6 shows a device diagram.

A circuit diagram of the optical power detection module above is shown in FIG. 5, which includes an optical-electrical conversion diode, an operational amplifier and an analog comparator. The optical-electrical conversion diode receives a re-duplicated optical-signal from the second optical splitter 14 and converts it to an electrical signal. After amplifying by the operational amplifier, the electrical signal is sent to the analog comparator and compares with a preset voltage signal of power threshold value. The comparison result is used to control the selection of the optical switch 15.

In the device, the optical switch 15 is a non-latching type. The default status of the optical switch is set so that the source-neighboring device 10 is connected with the destination-neighboring device 12 directly. Once the power of the protected device 11 is breakdown, data-flow between source-neighboring device 10 and destination-neighboring device will be broken only for a short time.

The protected device 11, using optical power detection is to protect the Ethernet interface, which is widely used. For example, when interface of the protected device is an Ethernet interface, since there is no link layer negotiating mechanism, the protected device and its neighboring devices cannot discover the fault of the optical sending module at the Ethernet interface of the protected device. In this case, by detecting optical power of a sending signal, a fault at the Ethernet interface can be discovered. For the Packet Over SDH/SONET (POS) interface, there is a negotiating mechanism at the interface, but the optical power detection is faster than the negotiating mechanism for discovery the fault at the interface.

Break time of a data-flow is determined by turnover time of the optical switch 15. When a mechanic type of optical switch is used, the turnover time is at millisecond level. When using such as micro electro mechanical system (MEMS) type optical switch, the turnover time will be shorter.

The foregoing description of the embodiments has been provided for purposes of illustration and description It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for data-flow protection of optical interface, comprising:
   receiving an optical-signal from a source-neighboring device;
   duplicating the optical-signal into at least two duplicated optical-signals: a first duplicated optical-signal and a second duplicated optical-signal;
   sending the first duplicated optical-signal to a protected device for processing;
   detecting whether optical power of an output optical-signal from the protected device is lower than a preset threshold value;
   receiving a working status signal output generated by the protected device and a detection result;
   selecting one from the second duplicated optical-signal and the output optical-signal from the protected device according to the working status signal and an detection result ; and
   sending the selected one to a destination-neighboring device.

2. The method according to claim 1, wherein selecting one from the second duplicated optical-signal and the output optical-signal from the protected device according to the working status signal and an detection result comprises:
   selecting the output optical-signal if the working status signal is normal and the detection result is that optical power of the output optical-signal is not lower than a preset threshold value; and
   selecting the second duplicated optical-signal if the working status signal is abnormal or the detection result is that optical power of the output optical-signal is lower than a preset threshold value.

3. The method according to claim 2, wherein detecting whether the optical power of the output optical-signal is lower than the preset threshold value comprises:
   re-duplicating the output optical-signal into at least two re-duplicated optical-signals, a first re-duplicated optical-signal and a second re-duplicated optical-signal;
   detecting whether the first re-duplicated optical-signal is lower than a preset threshold value
   accordingly,
   selecting the second re-duplicated optical-signal if the working status signal is normal and the detection result is that optical power of the first re-duplicated output optical-signal is not lower than the preset threshold value.

4. A data-flow protection device of an optical interface, comprising: a first optical-signal duplicating unit (13), an optical power detecting module (16) and an optical-signal selecting unit (15); wherein the first optical-signal duplicating unit (13) is adapted to duplicate an optical-signal into at least two duplicated optical-signals: a first duplicated optical-signal and a second duplicated optical-signal, wherein an input of the first optical-signal duplicating unit (13) is connected to a source-neighboring device (10) for receiving the optical-signal, a first output of the first optical-signal duplicating unit (13) is directly connected to a first input of the optical-signal selecting unit (15), a second output of the first optical-signal duplicating unit (13) connects to an input of a protected device (11);

the optical power detecting module (16) is adapted to detect whether optical power of an output optical-signal from the protected device (11) is lower than a preset threshold value, wherein an input of the optical power detecting module (16) is connected to the optical-signal output of the protected device (11), an output of the optical power detecting module (16) is connected to a third input of the optical-signal selecting unit (151); and the optical-signal selecting unit (15) is adapted to selecting one from the second duplicated optical-signal and the output optical-signal from the protected device (11) according to an working status signal and the detection result, wherein a first input of the optical-signal selecting unit (15) is connected to a first output of the first optical-signal duplicating unit (13), a second input of the optical-signal selecting unit (15) is connected to an output of the optical-signal from the protected device (11), a third input of the optical-signal selecting unit (15) is connected to the output of the optical power detecting module (16), a control end of the optical-signal selecting unit (15) is connected with a working status signal output of the protected device (11), an output of the optical-signal selecting unit (15) connects to a destination-neighboring device (12).

5. The data-flow protection device according to claim 4, between the protected device (11) and the optical-signal selecting unit (15), further comprising a second optical-signal duplicating unit (14) adapted to duplicate the output optical-signal into at least two re-duplicated optical-signals, wherein the input of the second optical-signal duplicating unit (14) is connected to the output optical-signal of the protected device (11), a first output of the second optical-signal duplicating unit (14) connects to the optical-signal selecting unit (15), a second output of the second optical-signal duplicating unit (14) connects to the input of the optical power detecting module (16).

6. The data-flow protection device according to claim 5, wherein the first optical-signal duplication unit (13) is an optical splitter, and the optical-signal selecting unit (15) is an optical switch.

7. The data-flow protection device according to claim 4, between the optical power detecting module (16) and the optical-signal selecting unit (15), further comprising a logic module (17), wherein inputs of the logic module (17) are connected to the working status signal output of the protected device (11) and the output of the optical power detecting module (16), respectively, and an output of the logic module (17) connects to the control end of the optical-signal selecting unit (15).

8. The data-flow protection device according to claim 7, wherein the optical power detecting unit (16) comprises an optical-electrical conversion diode, an operational amplifier and an analog comparator;

wherein the optical-electrical conversion component receives an optical-signal outputted by the second optical-signal duplicating unit (14), converts the optical-signal to an electrical signal and output the electrical signal to the operational amplifier;

the analog comparator receives the amplified electrical signal from the operational amplifier, compares the amplified electrical signal with a preset threshold value, outputs a control signal to the input of the logic module (17) control.

9. The data-flow protection device according to claim 8, wherein the first optical-signal duplication unit (13) is an optical splitter, and the optical-signal selecting unit (15) is an optical switch.

10. The data-flow protection device according to claim 7, wherein the first optical-signal duplication unit (13) is an optical splitter, and the optical-signal selecting unit (15) is an optical switch.

11. The data-flow protection device according to claim 4, wherein the first optical-signal duplication unit (13) is an optical splitter, and the optical-signal selecting unit (15) is an optical switch.

* * * * *